(12) United States Patent
Byrt

(10) Patent No.: US 10,046,456 B2
(45) Date of Patent: Aug. 14, 2018

(54) PIPE SPACING WEDGE SYSTEMS

(71) Applicant: Jamieson Michael Byrt, Edmonton (CA)

(72) Inventor: Jamieson Michael Byrt, Edmonton (CA)

(*) Notice: Subject to any disclaimer, the term of this patent is extended or adjusted under 35 U.S.C. 154(b) by 67 days.

(21) Appl. No.: 14/996,224

(22) Filed: Jan. 15, 2016

(65) Prior Publication Data

US 2017/0203431 A1    Jul. 20, 2017

(51) Int. Cl.
*G01B 3/30* (2006.01)
*B25H 7/00* (2006.01)

(52) U.S. Cl.
CPC ............... *B25H 7/005* (2013.01); *G01B 3/30* (2013.01)

(58) Field of Classification Search
CPC . B25H 7/005; G01B 3/30; G01B 3/14; G01B 3/50; G01B 3/563; G01B 5/12
USPC .......................................................... 33/567
See application file for complete search history.

(56) References Cited

U.S. PATENT DOCUMENTS

| | | | | |
|---|---|---|---|---|
| 386,469 | A * | 7/1888 | Howard | G01B 3/20 33/542 |
| 697,701 | A * | 4/1902 | Ayer | G01B 3/30 33/562 |
| 802,402 | A * | 10/1905 | Martin | G01B 3/30 33/567 |
| 1,872,240 | A | 7/1929 | Burnish | |
| 2,423,848 | A | 5/1945 | O'Connor | |
| 2,536,401 | A * | 1/1951 | Victor | G01B 3/30 33/567 |
| 2,803,883 | A | 7/1953 | Morano | |
| 3,210,068 | A | 4/1962 | Shelton | |
| 3,540,487 | A | 11/1970 | Lorusso | |
| 4,346,918 | A | 7/1982 | Lycan | |
| 4,505,420 | A | 3/1985 | Wittenbach | |
| 5,199,180 | A * | 4/1993 | Yablonsky | G01B 3/30 33/501.45 |
| 5,421,541 | A | 6/1995 | Condon | |
| 5,471,759 | A * | 12/1995 | Burrows | G01B 3/30 33/562 |
| 6,059,320 | A | 5/2000 | Lycan | |
| 6,560,887 | B2 * | 5/2003 | Byrnes | G01B 3/563 33/529 |

(Continued)

FOREIGN PATENT DOCUMENTS

| | | |
|---|---|---|
| CA | 2649980 | 5/2010 |
| EP | 0366399 | 5/1990 |

(Continued)

*Primary Examiner* — Yaritza Guadalupe-McCall
(74) *Attorney, Agent, or Firm* — Integrity Patent Group, PLC; Edwin Wold

(57) ABSTRACT

A pipe spacing wedge system including a pipe spacing wedge assembly, with the pipe spacing wedge assembly including a wedge-body. The wedge-body may be defined by a front-side, a back-side, a right-edge, a left-edge, a top-edge, and a bottom-edge. The front-side of the wedge-body includes a plurality of stepped surfaces and the top-edge includes a sharp point. The pipe spacing wedge assembly is structured and arranged to assist a user in setting a variety of specific gap-distance between sections of pipe and pipe spacing wedge assembly is intended to be driven between the two sections of pipe by the user to set the gap-distance.

18 Claims, 5 Drawing Sheets

(56) References Cited

U.S. PATENT DOCUMENTS

| | | | | |
|---|---|---|---|---|
| 6,862,815 B1* | 3/2005 | Blouch | ............... | B25H 7/00 |
| | | | | 33/562 |
| 6,901,672 B1* | 6/2005 | Reilly | ............... | G01B 3/30 |
| | | | | 33/501.45 |
| 7,188,430 B2* | 3/2007 | Tange | ............... | G01B 3/306 |
| | | | | 33/501.45 |
| 8,292,161 B2 | 10/2012 | Hacikyan | | |
| 8,881,420 B2* | 11/2014 | Colombo | ............... | G01B 3/50 |
| | | | | 33/542 |
| 8,950,118 B2* | 2/2015 | Kuivila | ............... | E05F 7/005 |
| | | | | 49/381 |
| 2017/0203431 A1* | 7/2017 | Byrt | ............... | B25H 7/005 |

FOREIGN PATENT DOCUMENTS

| | | | |
|---|---|---|---|
| JP | 57-126003 U | 8/1982 | |
| JP | 7-225101 A | 8/1995 | |

* cited by examiner

PIPE SPACING WEDGE SYSTEMS

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of pipe spacing devices and more specifically relates to pipe spacing wedge systems.

2. Description of Related Art

Standard pipeline construction generally requires the use of multiple sections of pipe which must be joined together to form a longer pipeline. Various methods are available to join these sections of pipe. Some methods include the use of mechanical restraints, joining pipe by adhesive, or the pipe sections may use a bell-and-spigot and hold together by friction. In the case of metallic pipe, including steel and steel alloys, joining the pipe sections by welding, brazing, or soldering is common in the industry.

When welding metallic pipe, great care must be taken to ensure that the welds are of the proper thickness and depth to ensure longevity of the pipeline and leak-free construction. Therefore the gap spacing used and to be filled by welds is of great importance. Various methods may be employed to ensure the proper gap spacing.

Common methods of ensuring the proper gap between sections of pipe include the use of a wedge, a gap rod, or a spacing ring. These devices are either placed between the pipe sections as they are brought together or may be hammered/driven/pryed into a smaller gap to open the gap to a wider predetermined width. These devices are also used to gauge the gap. Generally, a wedge or gap rod is a specific thickness such that they can only be used for a single gap width. This limitation requires that the pipefitter or tradesman must have available multiple different wedges or gap rods to cover the range of desired gaps during construction. This limitation makes pipeline construction more costly and time consuming. Therefore a suitable solution is required.

Several attempts have been made to solve the above-mentioned problems such as those found in U.S. and Foreign Pat. And Pub. Nos. U.S. Pat. No. 4,505,420 to Wittenbach, U.S. Pat. Nos. 6,059,320 and 4,346,918 to Lycan, U.S. Pat. No. 2,423,848 to O'Connor, U.S. Pat. No. 1,872,240 to Burnish, U.S. Pat. No. 3,540,487 to Lorusso, U.S. Pat. No. 3,210,068 to Shelton, U.S. Pat. No. 2,803,883 to Morano, U.S. Pat. No. 8,292,161 and CA 2,649,980 to Hacikyan, U.S. Pat. No. 5,421,541 to Condon, and EP 0,366,399 to Jones. This art is representative of pipe spacing devices. However, none of the above inventions and patents, taken either singly or in combination, is seen to describe the invention as claimed.

Preferably, a pipe spacing wedge system should provide a device to allow a user to quickly and accurately set a variety of different specific gap widths between sections of pipe and, yet would operate reliably and be manufactured at a modest expense. Thus, a need exists for a reliable pipe spacing wedge system to avoid the above-mentioned problems.

BRIEF SUMMARY OF THE INVENTION

In view of the foregoing disadvantages inherent in the known pipe spacing device art, the present invention provides a novel pipe spacing wedge system. The general purpose of the present invention, which will be described subsequently in greater detail is to provide a device to allow a user to quickly and accurately set a variety of different gaps widths between sections of pipe during fabrication or coupling. The present invention lends itself to use during pipe to pipe connections, pipe to fitting connections, pipe to flange connections or fitting to flange connections.

A pipe spacing wedge system is disclosed herein, in a preferred embodiment, comprising a pipe spacing wedge assembly; the pipe spacing wedge assembly comprising a wedge-body. The wedge-body may comprise a front-side, a back-side, a right-edge, a left-edge, a top-edge, and a bottom-edge. In a preferred embodiment, the front-side of the wedge-body may comprise a plurality of stepped surfaces and the top-edge may comprise a sharp point. The sharp point may comprise a double edge or a single edge.

The pipe spacing wedge assembly is structured and arranged to assist a user in setting a variety of specific gap-distances between sections of pipe, in the preferred embodiment, and thus the pipe spacing wedge assembly is designed as intended to be driven between two sections of pipe by the user to set the gap-distance, or to be pryed upon to achieve desired Hi-Lo. A preferred embodiment may include the pipe spacing wedge assembly constructed of a tempered material to provide sufficient hardness and durability in use and the front-side may comprise a non-smooth texture to prevent the pipe spacing wedge system from being inserted into the two sections of pipe. Back side may comprise various surface textures (to prevent wedge from slipping too deep into gap) or no texture.

In the preferred embodiment, the right-edge and the left-edge of the wedge-body may be substantially parallel. The top-edge and the bottom-edge of the wedge-body may also be substantially parallel. Additionally, the plurality of stepped surfaces of the front-side may be substantially parallel in alignment. A height of the plurality of stepped surfaces may be non-equal and each of the heights may lie at a 45-degree angle in relation to the plurality of stepped surfaces in a preferred embodiment. Other angles may be used. Also, the plurality of stepped surfaces may be each ⅜" in length, dependent upon the specific use and application of the pipe spacing wedge system.

A preferred embodiment of a pipe spacing wedge system may include the stepped surfaces which may further comprise numeric-indications of the heights of the plurality of stepped surfaces and the numeric-indications may be fractional-inch indications or other suitable measurement means. Other forms of marking may be used.

The front-side of the pipe spacing wedge system may comprise an aperture to aid the user during use of the pipe spacing wedge system, and the aperture may be ⅜" in diameter. A center of the aperture may be located at a distance of ¾" from the bottom-edge in a preferred embodiment. The device may be carried via the aperture.

The present invention holds significant improvements and serves as a pipe spacing wedge system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, pipe spacing wedge systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a pipe spacing device and more particularly to a pipe spacing wedge system as used to improve the quickness and accuracy of setting a variety of specific gap-distances between sections of pipe.

Generally speaking, a pipe spacing wedge system can be easily operated by a user while providing an accurate means for the user to accurately set a variety of specific gap-distances between sections of pipe, using only one wedge. Steps may be found on one side of the device or on both sides. Multiple wedges may be used.

Figure 1:
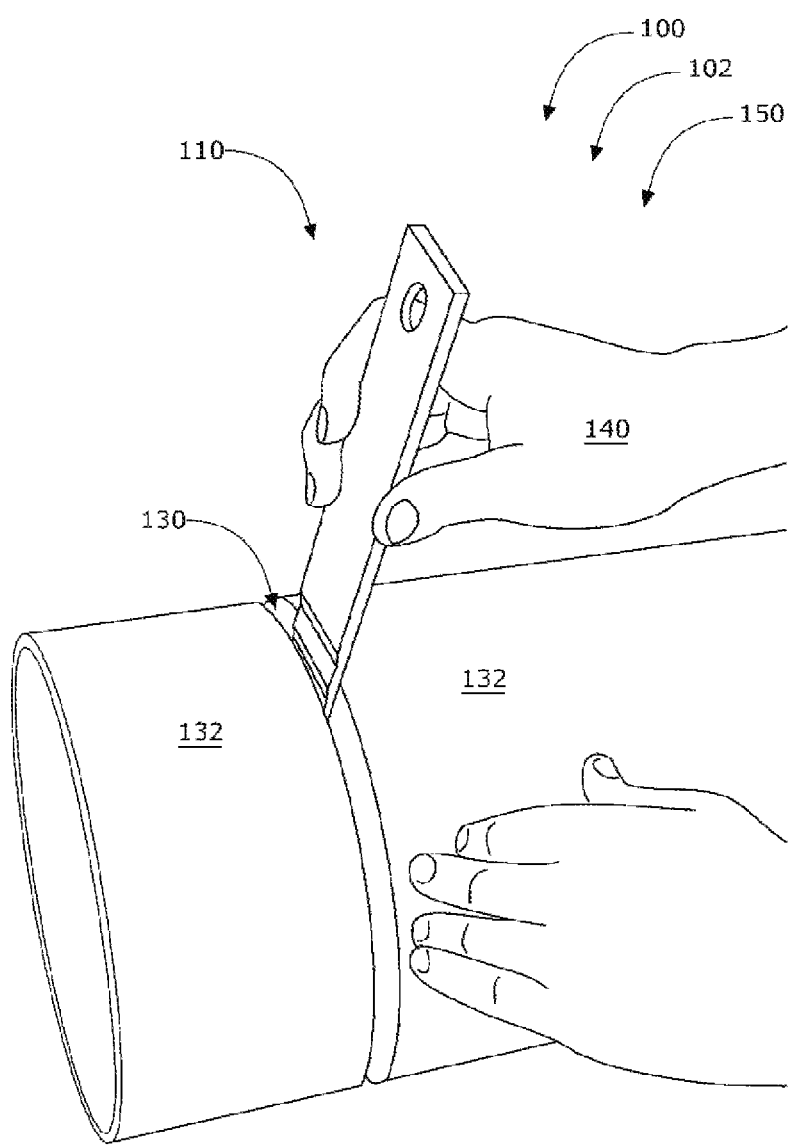
FIG. 1 shows a perspective view illustrating a pipe spacing wedge system during an 'in-use' condition showing a user setting a specific-gap distance between two sections of pipe according to an embodiment of the present invention.

Referring to the drawings by numerals of reference there is shown in FIGS. 1-4, a pipe spacing wedge system 100. Referring now more specifically to FIG. 1, showing pipe spacing wedge systems 100 during 'in-use' condition 150 according to an embodiment of the present invention.

Figure 2:
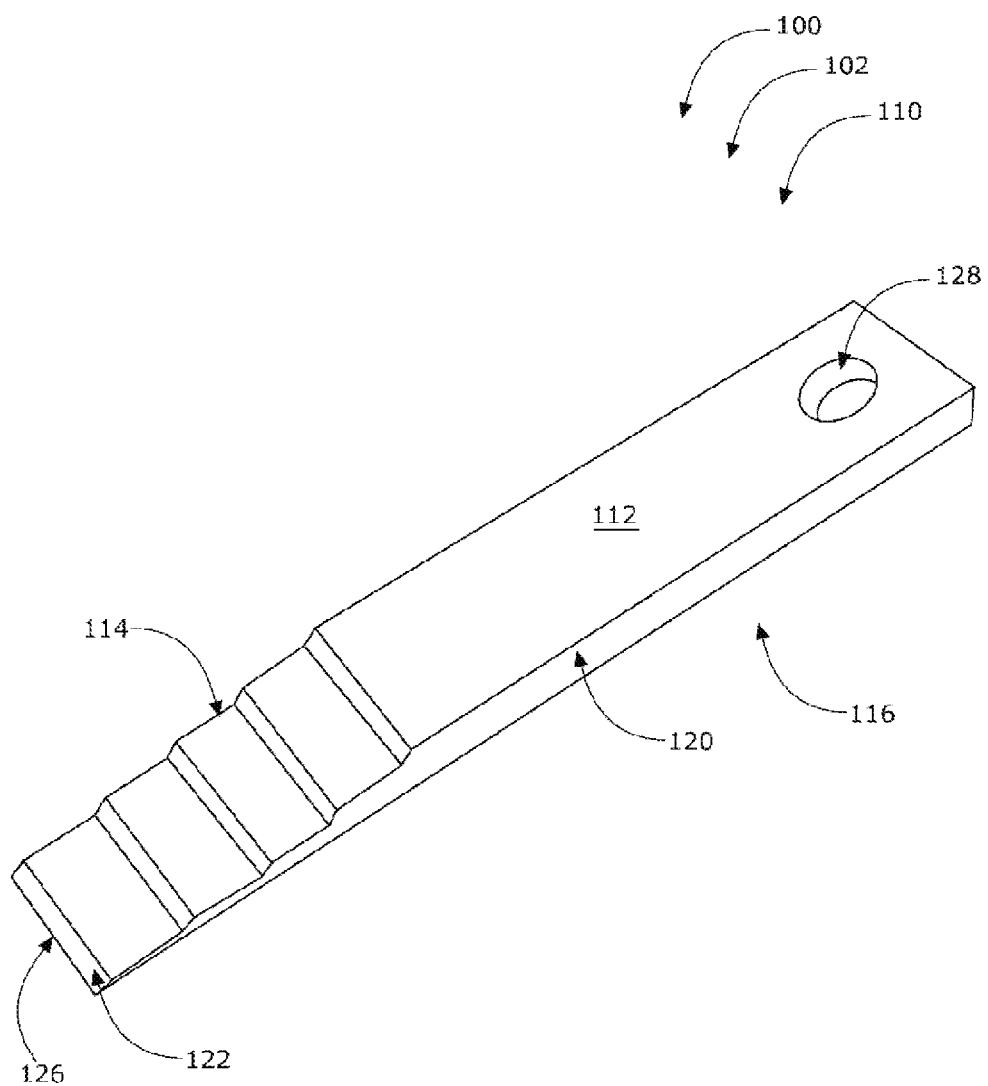
FIG. 2 is a perspective view illustrating the pipe spacing wedge system comprising a wedge-body according to an embodiment of the present invention of FIG. 1.
Figure 3:
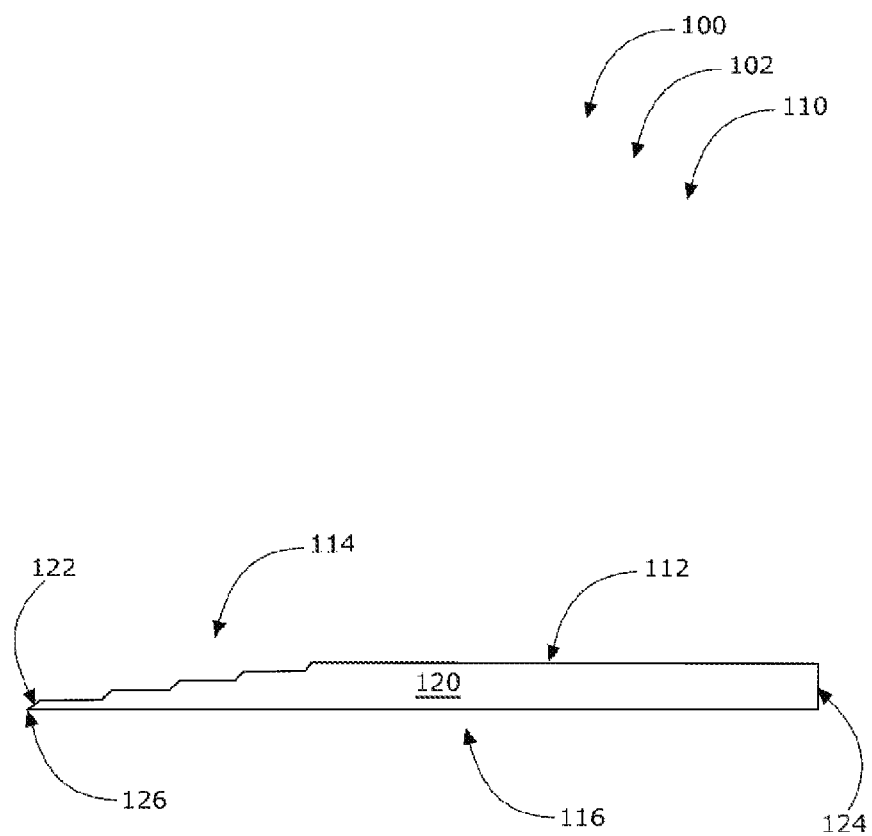
FIG. 3 is a side perspective view illustrating the pipe spacing wedge assembly including a plurality of stepped surfaces according to an embodiment of the present invention of FIGS. 1-2.
Figure 4:
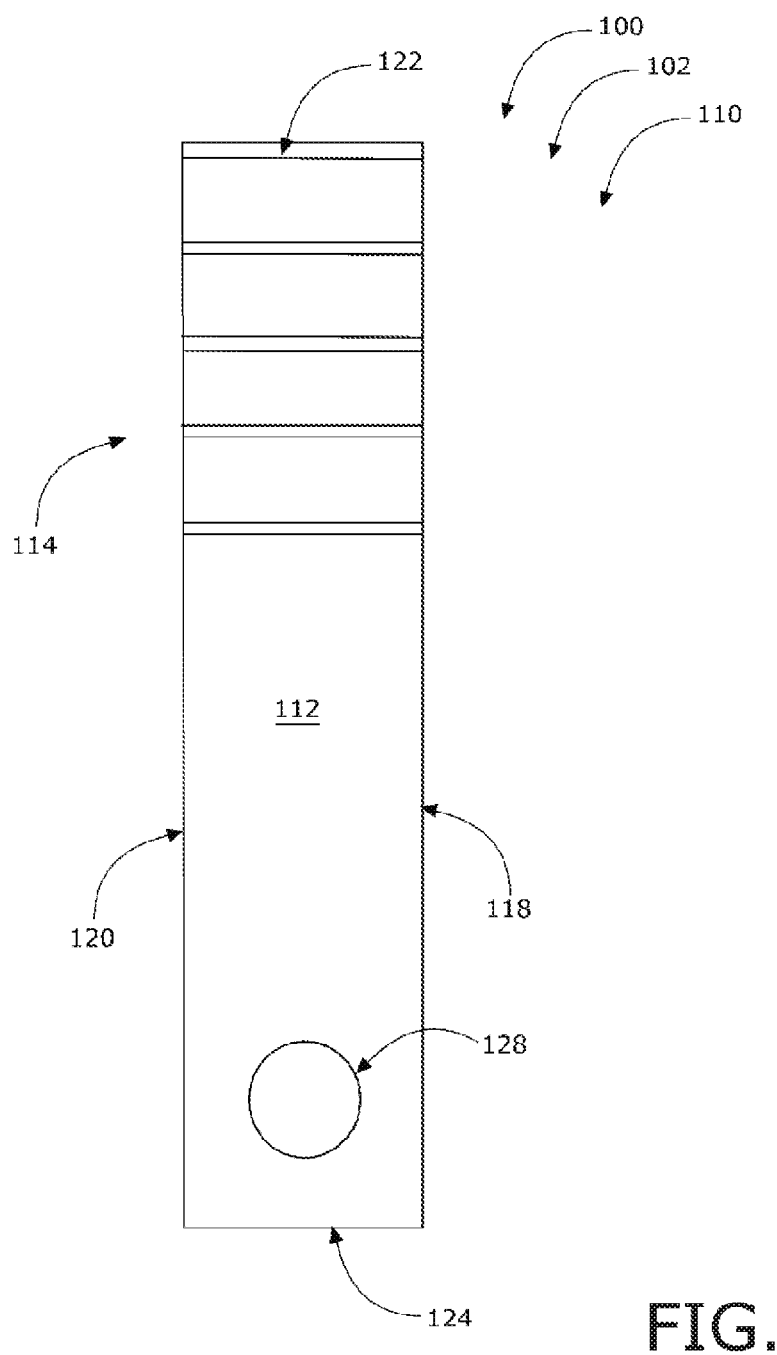
FIG. 4 is a top-side perspective view illustrating the pipe spacing wedge assembly (tool) according to an embodiment of the present invention of FIGS. 1-3.

FIGS. 2-4, show pipe spacing wedge systems 100 comprising pipe spacing wedge assembly 102 having wedge-body 110. Wedge-body 110 comprises front-side 112, back-side 116, right-edge 118, left-edge 120, top-edge 122, and bottom-edge 124. Front-side 112 further comprises plurality of stepped surfaces 114 and top-edge 122 comprises sharp point 126, as shown. Pipe spacing wedge assembly 102 is structured and arranged to assist user 140 in setting a variety of specific gap-distances 130 between sections of pipe 132 and pipe spacing wedge assembly 102 is driven between two sections of pipe 132 by user 140. Pipe spacing wedge assembly 102 is preferably constructed of a tempered material to provide sufficient hardness and durability during use in some embodiments.

Embodiments of pipe spacing wedge system top-edge and said bottom-edge are substantially parallel 100 include arrangements where plurality of stepped surfaces 114 are substantially parallel in alignment; right-edge 118 and left-edge are substantially parallel 120, and top-edge 122 and bottom-edge are substantially parallel 124. Embodiments include front-side 112 comprising a non-smooth texture to prevent pipe spacing wedge system 100 from being fully inserted into two sections of pipe 132. Alternate embodiments may comprise different profiles.

A height between plurality of stepped surfaces 114 are equal in some embodiments, where other embodiments include heights of plurality of stepped surfaces 114 which are non-equal. In the embodiments which include heights of plurality of stepped surfaces 114 which are non-equal, further embodiments may include heights which are sequentially smaller in relation to increase in proximity to top-edge 122. Additional embodiments include heights which lie at a 45-degree angle in relation to plurality of stepped surfaces 114. Other angles may be used dependent upon the application. Some embodiments may include plurality of stepped surfaces 114 which are each ⅜" in length, and may vary dependent upon the specific application.

Embodiments of pipe spacing wedge system 100 include plurality of stepped surfaces 114 which further comprises numeric-indications of heights of plurality of stepped surfaces 114. The numeric-indications may comprise fractional-inch indications, and in alternate embodiments, may comprise millimeter indications or other such indications.

Front-side 112 may further comprise aperture 128 to aid use of pipe spacing wedge assembly 102 by user and aperture may be ⅜" in diameter and center of aperture 128 may be located at a distance of ¾" from bottom-edge 124. Other diameters and distances may be used in other embodiments.

Pipe spacing wedge system 100 may be sold as a kit comprising the following parts: at least one pipe spacing wedge assembly 102 and at least one set of user instructions. The kit has instructions such that functional relationships are detailed in relation to the structure of the invention (such that the invention can be used, maintained, or the like in a preferred manner). Pipe spacing wedge system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different stepping and profiling combinations, parts may be sold separately, etc., may be sufficient.

Figure 5:
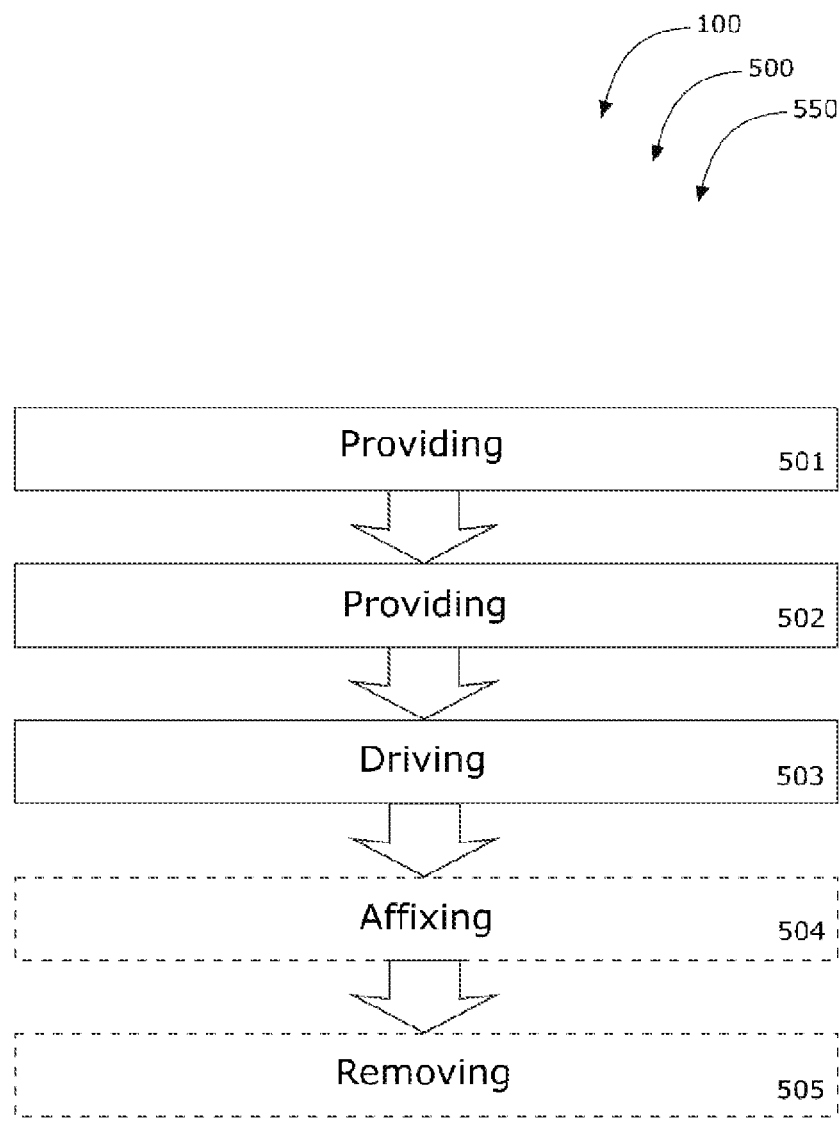
FIG. 5 is a flowchart illustrating a method of use for the pipe spacing wedge system according to an embodiment of the present invention of FIGS. 1-4.

Referring now to FIG. 5 showing flowchart 550 illustrating method of use 500 for a pipe spacing wedge system 100 according to an embodiment of the present invention of FIGS. 1-4.

As shown, method of use 500 may comprise the steps of: step one 501, providing pipe spacing wedge assembly 102; step two 502, providing at least two sections of pipe 132; step three 503, driving pipe spacing wedge assembly 102 between two of the at least two sections of pipe 132 to a predetermined depth to provide a predetermined gap; step four 504, affixing (weld tacking or the like) two of the at least two sections of pipe 32 together; and step five 505, removing pipe spacing wedge assembly 102 from the two of at least two sections of pipe 132.

It should be noted that step four 504 and step five 505 are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A pipe spacing wedge system comprising:
    a) a pipe spacing wedge assembly comprising:
        i) a wedge-body comprising:
            an aperture;
            a front-side comprising:
                a plurality of stepped surfaces;
            a back-side comprising more than one surface texture;
            a right-edge;
            a left-edge;
            a top-edge comprising:
                a sharp point; and
            a bottom-edge;
    b) wherein said plurality of stepped surfaces are substantially parallel in alignment;
    c) wherein said more than one surface texture on said back-side are structured and arranged to prevent said pipe spacing wedge from slipping completely into a gap formed between two sections of pipe;
    d) wherein said aperture is located at an opposite-end of said wedge-body from location of said sharp point;
    e) wherein said aperture is structured and arranges with said plurality of stepped surfaces and further structured and arrange with said sharp point to assist a user in setting a variety of specific gap-distances between sections of pipe when the user drives said pipe spacing wedge assembly between the two sections of pipe.
2. The pipe spacing wedge system of claim 1 wherein said right-edge and said left-edge are substantially parallel.
3. The pipe spacing wedge system of claim 2 wherein said top-edge and said bottom-edge are substantially parallel.
4. The pipe spacing wedge system of claim 1 wherein said pipe spacing wedge assembly is constructed of a tempered material to provide sufficient hardness and durability in use.
5. The pipe spacing wedge system of claim 1 wherein a height between said plurality of stepped surfaces are equal.
6. The pipe spacing wedge system of claim 1 wherein a height between said plurality of stepped surfaces are non-equal.
7. The pipe spacing wedge system of claim 6 wherein each of said heights is sequentially smaller in relation to an increase in proximity to said top-edge.
8. The pipe spacing wedge system of claim 7 wherein each of said heights lies at a 45-degree angle in relation to said plurality of stepped surfaces.
9. The pipe spacing wedge system of claim 8 wherein said plurality of stepped surfaces are each ⅜" in length.
10. The pipe spacing wedge system of claim 1 wherein said plurality of stepped surfaces further comprises numeric-indications of said heights of said plurality of stepped surfaces.
11. The pipe spacing wedge system of claim 10 wherein said numeric-indications comprise fractional-inch indications.
12. The pipe spacing wedge system of claim 11 wherein said numeric-indications comprise millimeter indications.
13. The pipe spacing wedge system of claim 12 wherein said aperture is ⅜" in diameter.
14. The pipe spacing wedge system of claim 13 wherein a center of said aperture is located ¾" from said bottom-edge.
15. A pipe spacing wedge system comprising:
    a) a pipe spacing wedge assembly comprising;
        i) a wedge-body comprising;
            an aperture;
            a front-side comprising;
                a plurality of stepped surfaces;
            a back-side comprising more than one surface texture;
            a right-edge;
            a left-edge;
            a top-edge comprising:
                a sharp point; and
            a bottom-edge;
    b) wherein said plurality of stepped surfaces are substantially parallel in alignment;
    c) wherein said more than one surface texture on said back-side are structured and arranged to prevent said pipe spacing wedge from slipping completely into a gap formed between two sections of pipe;
    d) wherein said aperture is located at an opposite-end of said wedge-body from location of said sharp point;
    e) wherein said aperture is structured and arranges with said plurality of stepped surfaces and further structured and arrange with said sharp point to assist a user in setting a variety of specific gap-distances between sections of pipe when the user drives said pipe spacing wedge assembly between the two sections of pipe;
    f) wherein said pipe spacing wedge assembly is structured and arranged to assist a user in setting a variety of specific gap-distances between sections of pipe;
    g) wherein said pipe spacing wedge assembly is driven between said two sections of pipe by said user;
    h) wherein said right-edge and said left-edge are substantially parallel;
    i) wherein said top-edge and said bottom-edge are substantially parallel;
    j) wherein said pipe spacing wedge assembly is constructed of a tempered material to provide sufficient hardness and durability in use;

k) wherein said front-side further comprises a non-smooth texture to prevent said pipe spacing wedge system from being inserted into said two sections of pipe;
l) wherein a height between said plurality of stepped surfaces are non-equal;
m) wherein each of said heights lies at a 45-degree angle in relation to said plurality of stepped surfaces;
  i) wherein said plurality of stepped surfaces are each 3/8" in length;
n) wherein said plurality of stepped surfaces further comprises numeric-indications of said heights of said plurality of stepped surfaces;
o) wherein said numeric-indications comprise fractional-inch indications;
p) wherein said front-side further comprises an aperture to aid use of said pipe spacing wedge assembly;
q) wherein said aperture is 3/8" in diameter; and
r) wherein a center of said aperture is located 3/4" from said bottom-edge.

16. The pipe spacing wedge system of claim 15 further comprising a kit including:
   at least one said pipe spacing wedge assembly; and
   a set of user instructions.

17. A method of using a pipe spacing wedge system comprising the steps of:
   providing a pipe spacing wedge assembly;
   providing at least two sections of pipe; and
   driving said pipe spacing wedge assembly between two of said at least two sections of pipe to a predetermined depth to provide a predetermined gap.

18. The method of claim 17 further comprising the steps of:
   affixing said two of said at least two sections of pipe; and
   removing said pipe spacing wedge assembly from said two of at least two sections of pipe.

* * * * *